United States Patent [19]

Hussain et al.

[11] Patent Number: 5,291,792
[45] Date of Patent: Mar. 8, 1994

[54] MASS FLOW METER

[75] Inventors: Yousif A. Hussain, Coulsdon; Chris N. Rolph, Redhill, both of Great Britain

[73] Assignee: Krohne A.G., Uferstrasse, Switzerland

[21] Appl. No.: 993,429

[22] Filed: Dec. 21, 1992

[51] Int. Cl.[5] ............................................. G01F 1/84
[52] U.S. Cl. ................................................. 73/861.37
[58] Field of Search ......................... 73/861.37, 861.38

[56] References Cited

U.S. PATENT DOCUMENTS

| | | |
|---|---|---|
| 3,329,019 | 7/1967 | Sipin . |
| 4,622,858 | 11/1986 | Mizerak . |
| 4,660,421 | 4/1987 | Dahlin et al. ............... 73/861.38 |
| 4,680,974 | 7/1987 | Simonsen et al. . |
| 4,730,501 | 3/1988 | Levien .......................... 73/861.38 |
| 4,756,198 | 7/1988 | Levien .......................... 73/861.38 |
| 4,823,614 | 4/1989 | Dahlin ......................... 73/861.38 |

FOREIGN PATENT DOCUMENTS

| | | |
|---|---|---|
| 9012610 | 9/1990 | Fed. Rep. of Germany . |
| 4124296 | 7/1991 | Fed. Rep. of Germany . |

*Primary Examiner*—Herbert Goldstein
*Attorney, Agent, or Firm*—Cesari and McKenna

[57] ABSTRACT

A mass flow meter for flow media which works on the Coriolis Principle, has a straight Coriolis pipe carrying the flow medium, an oscillator acting on the Coriolis pipe and two transducers detecting Coriolis forces and-/or Coriolis oscillations based on Coriolis forces. The Coriolis pipe also carries mass bodies and is arranged inside of a housing or compensation cylinder. The mass flow meter improves the measurement result that can be obtained by increasing the stiffness of the Coriolis pipe for the excitation mode, preferably by including a reinforcing spring which acts on Coriolis pipe to increase the pipe stiffness for the excitation mode.

1 Claim, 1 Drawing Sheet

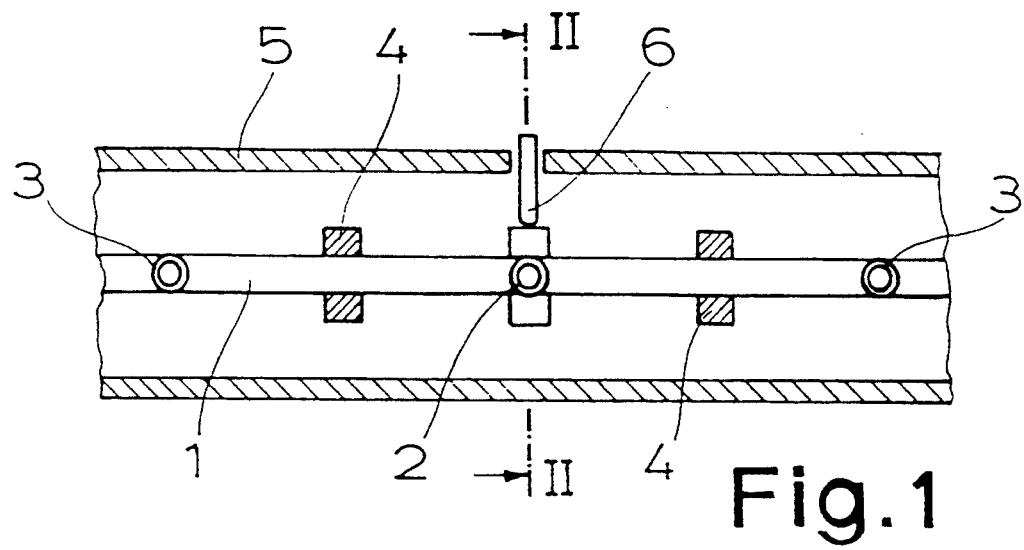
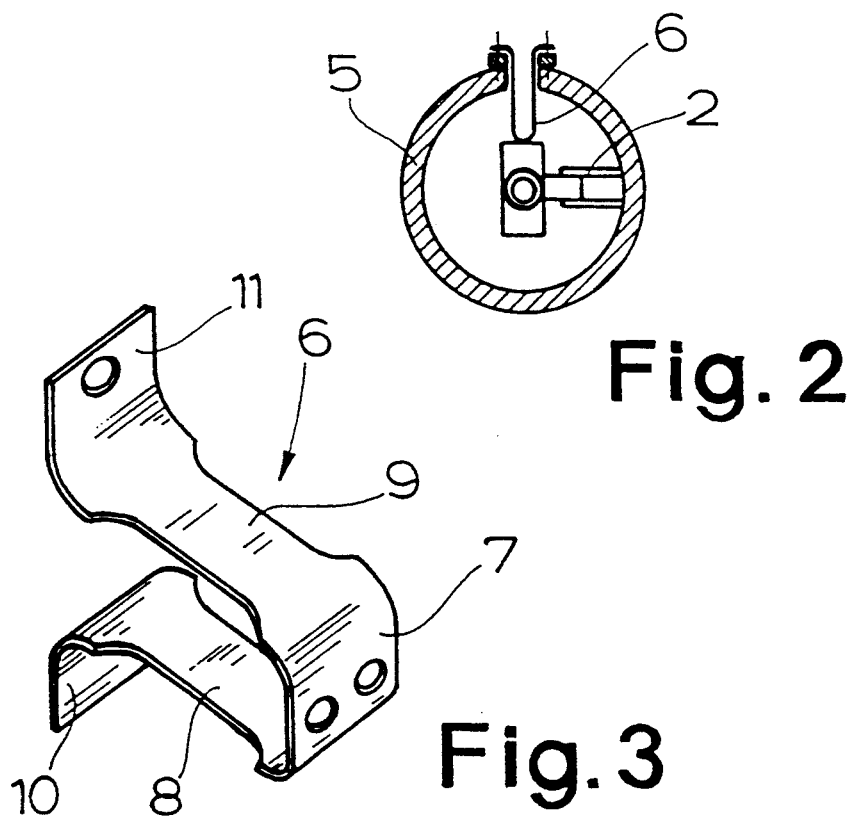

5,291,792

MASS FLOW METER

FIELD OF THE INVENTION

The invention concerns a mass flow meter for flow media that works on the Coriolis Principle, with at least one basically straight Coriolis pipe carrying the flow medium, at least one oscillator acting on the Coriolis pipe and at least one transducer that detects Coriolis forces and/or Coriolis oscillations based on Coriolis forces.

BACKGROUND OF THE INVENTION

Mass flow meters for flow media that work on the Coriolis Principle are well known in various embodiments (see, for example, German Disclosure Documents 26 29 833, 28 22 087, 28 33 0379 29 38 498, 30 07 361, 33 29 544, 34 43 234, 35 03 841, 35 05 166, 35 26 2977 37 07 777, 39 16 285, 39 28 839, 40 16 907, 41 24 295 and 41 24 296, European Patent Disclosure Documents 0 083 144, 0 109 218, 0 119 638, 0 196 150, 0 210 308, 2 212 782, 0 235 274, 0 239 679, 0 243 468, 0 244 692, 0 271 605, 0 275 367, and 0 282 552, as well as U.S. Pat. Nos. 4,491,009, 4,628,744 and 4,666,421) and are increasingly being used in practice.

Mass flow meter for flow media that work on the Coriolis Principle are basically divided into those whose pipes are designed to be straight, and those whose pipes are designed to be curved—with single or multiple pipes—and as pipe loops. The mass flow meters in question are also divided into those with only one Coriolis pipe and those with two; in designs with two, they may be in series or in parallel fluidically.

Embodiments of mass flow meters in which the Coriolis pipe or pipes are designed to be straight are simple in mechanical design and consequently can be produced at relatively low cost. Also, the inner surfaces of the pipes are easy to work on, for example, to polish. They also have low pressure losses. The disadvantage is that at a certain construction or layout length, their natural frequency is relatively high. Embodiments of mass flow meters whose pipe or pipes are designed to be curved have disadvantages whereas those with a straight pipe or pipes have advantages; but their advantage is that at a certain construction length, their natural frequency is relatively low.

In a mass flow meter that works on the Coriolis Principle and has at least one basically straight Coriolis pipe, at a certain construction length, a relatively low natural frequency can be created, and at a certain natural Frequency, a relatively short construction length can be created, by having an oscillator that acts on the Coriolis pipe via a pendulum arm (see pending U.S. patent application Ser. No. 07/736,400, filed Jul. 26, 1991, claiming priority from German application P40 23 989.6 of Jul. 28, 1990). While the oscillator acts directly on the Coriolis pipe and thus excites the Coriolis pipe, at least almost exclusively, to bending oscillations in the commonly known mass flow meters with at least one basically straight Coriolis pipe, in the mass flow meter just described, where the oscillator acts on the Coriolis pipe via a pendulum arm, the Coriolis pipe is excited to torsion and bending oscillations. The point is that the natural frequency relevant for bending oscillations can be influenced, without influencing the length, the mass and/or the stiffness of the Coriolis pipe, namely by the pendulum arm, i.e., by the mass of the pendulum arm and by the distance between the longitudinal axis of the Coriolis pipe and the point where the oscillator acts on the pendulum arm. The aforesaid pending application discloses designs and advancements of the mass flow meter just described. To prevent repetition, therefore, reference will be made expressly to the content of U.S. patent application Ser. No. 07/736,400, which is hereby incorporated herein by reference.

Incidentally, in the mass flow meters that work on the Coriolis Principle that are known from the previous publications and have at least one basically straight Coriolis pipe, it is true that the Coriolis oscillations have a relatively low amplitude, so that only a very low measured value can be obtained. This is because of the relatively high stiffness of the straight Coriolis pipe, both in the excited mode and in the Coriolis mode.

In all the mass flow meters in question that work on the Coriolis Principle and have at least one basically straight Coriolis pipe, problems can also result from the fact that undesirable, i.e., interfering, oscillations can occur at frequencies that are relatively close to the frequencies of the desired oscillations, i.e., oscillations in the excitation mode and in the Coriolis mode.

SUMMARY OF THE INVENTION

Accordingly, an object of the invention is to improve the mass flow meter on which the invention is based in terms of the measurement results that can be obtained.

Another object is to provide a mass flow meter which minimizes the effects of interfering oscillations of the meter's flow pipe.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

The mass flow meter of the invention, which reaches the aforesaid objectives is characterized first and foremost by the fact that the stiffness of the Coriolis pipe is high in the excitation mode, especially due to the fact that the Coriolis pipe has a reinforcing spring that increases its stiffness for the excitation mode. Preferably, there is only one reinforcing spring, and it is in the middle of the Coriolis pipe. According to the invention, the stiffness of the Coriolis pipe is high for the excitation mode, without nominally influencing the stiffness of the Coriolis pipe for the Coriolis mode. This can ensure that the frequency of the oscillations in the excitation mode contrasts with the frequency of the undesired, i.e., interfering, oscillations sharply enough so that the influence of such interfering oscillations in thus largely suppressed.

Now, there are various ways of designing and developing the mass flow meter according to the invention. In this connection, please refer to the embodiments that will be described along with the drawings.

BRIEF DESCRIPTION OF THE DRAWINGS

For a fuller understanding of the nature and objects of the invention, reference should be had to the following detailed description taken in connection with the accompanying drawings, in which:

FIG. 1 shows schematically a section through one part of a preferred embodiment of a mass flow meter according to the invention;

FIG. 2 is a sectional view of the mass flow meter taken along line II—II of FIG. 1, and FIG. 3 is an enlarged isometric view of the reinforcing spring incorporated into the mass flow meter in FIGS. 1 and 2.

DESCRIPTION OF THE PREFERRED EMBODIMENT

The mass flow meter for flow media according to the invention is one that works on the Coriolis Principle. Consequently, the mass flow meter according to the invention has at least one straight Coriolis pipe 1 that carries the flow medium, an oscillator 2 acting on the Coriolis pipe 1 by way of a mounting block on the pipe and two transducers 3 detecting Coriolis forces and/or Coriolis oscillations based on Coriolis forces. FIG. 1 also shows that the Coriolis pipe 1 has mass bodies 4 through whose mass and arrangement along the pipe, the natural frequency of the Coriolis pipe 1 can be influenced within certain limits, as is well known by the skilled artisan.

FIGS. 1 and 2 show that the Coriolis pipe 1 is arranged within a housing or compensation cylinder 5. Other details on the significance of the housing or compensation cylinder 5 and components that go with the mass flow meter—connecting rings, receiving cylinder, connecting flanges, connecting pipes, reinforcing cylinder—cannot be inferred from the figures. For them, please refer to pending U.S. patent application Ser. No. 07/917,517, filed Jul. 21, 1992, whose contents are expressly incorporated herein by reference.

When oscillator 2 is energized, it oscillates pipe 1 in an oscillation mode, i.e., laterally in FIG. 2. When fluid flows through pipe 1, the pipe is caused to oscillate in a Coriolis mode as is well known, for example, from U.S. Pat. Nos. 3,329,019; 4,632,858 and 4,680,974, whose contents are incorporated by reference herein.

Those oscillations are detected by transducers 3 which produce corresponding electrical signals which are processed in well known ways to provide an indication of a characteristic such as mass flow or density of a medium flowing through pipe 2.

According to the invention, as FIGS. 1 and 2 show, the Coriolis pipe 2 has a reinforcing spring 6 to increase its stiffness for the excitation mode. Preferably, although not necessarily, reinforcing spring 6 acts in the middle of the Coriolis pipe 1. The theory behind the invention thus leads to an increase in the stiffness of the Coriolis pipe 1 for the excitation mode, without the stiffness of the Coriolis pipe 1 being thereby influenced for the Coriolis mode. The step taken in the invention now ensures that the frequency of the oscillations of the Coriolis pipe 1 in the excitation mode contrasts with the frequency of the undesired, i.e., interfering, oscillations sharply enough so that the influence of such interfering oscillations is therefore largely suppressed in the flow meter output.

The reinforcing spring 6 provided according to the invention can be designed in different ways. In the illustrated embodiment, the reinforcing spring 6, as FIG. 3 especially shows, is designed as a leaf spring, U-shaped with a bar 7 attached to the mounting block and two legs 8, 9, and on each end of the legs 8, 9, remote from the bar, there are attachment flanges 10, 11 facing out secured to housing 5.

As already described above, the illustrated embodiment of a mass flow meter according to the invention is one in which the Coriolis pipe 1 is inside a housing or compensation cylinder 5. The reinforcing spring 6 is then between the Coriolis pipe 1 and the housing or compensation cylinder 5. The bar 7 of the reinforcing spring 6 is attached to the Coriolis pipe, and its attachment flanges 10, 11 are attached to the housing or compensation cylinder.

It will thus be seen that the objects set forth above, among those made apparent from the preceding description are efficiently attained and, since certain changes may be made in the above construction without departing from the scope of the invention, it is intended that all matter contained in the above description or shown in the accompanying drawings shall be interpreted as illustrative and not in limiting sense.

It should also be understood that the following claims are intended to cover all of the generic and specific features of the invention herein described.

We claim:

1. A mass flow meter for flow media that works on the Coriolis Principle, with at least one basically straight Coriolis pipe carrying the flow medium, at least one oscillator acting on the Coriolis pipe, at least one transducer detecting Coriolis forces and/or Coriolis oscillations based on Coriolis forces and stiffness increasing means including at least one reinforcing leaf spring (6) acting in the middle of the Coriolis pipe (1) that increases the stiffness of the Coriolis pipe for the excitation mode, the improvement wherein said spring is generally U-shaped with a bar (7) and two legs (8,9) connected to opposite ends of the bar, there being at least one flange (10, 11) on the ends of the legs (8,9) remote from the bar (7), said Coriolis pipe (1) is situated inside a housing (5) and the spring (6) is attached by said bar (7) to the Coriolis pipe (1) and is attached by said at least one flange (10,11) to the housing (5).

* * * * *

UNITED STATES PATENT AND TRADEMARK OFFICE
CERTIFICATE OF CORRECTION

PATENT NO. : 5,291,792

DATED : March 8, 1994

INVENTOR(S) : Yousif A. Hussain and Chris N. Rolph

It is certified that error appears in the above-identified patent and that said Letters Patent is hereby corrected as shown below:

Title page, item    [30] insert:
 — Foreign Application Priority Data
 Dec. 19, 1991 [DE]  Fed. Rep. of Germany ..... 4142040.3
 Jan. 3, 1992 [DE]   Fed. Rep. of Germany ..... 4200060.2 —

Signed and Sealed this

Eleventh Day of February, 1997

Attest:

BRUCE LEHMAN

*Attesting Officer*          *Commissioner of Patents and Trademarks*